United States Patent Office 3,574,233
Patented Apr. 6, 1971

3,574,233
BICYCLIC SULFUR COMPOUNDS
Edward D. Weil, Yonkers, N.Y., assignor to Hooker
Chemical Corporation, Niagara Falls, N.Y.
No Drawing. Continuation-in-part of application Ser. No. 482,287, Aug. 24, 1965. This application Apr. 1, 1968, Ser. No. 718,006
Int. Cl. A01n 9/12; C07d 63/10, 65/10
U.S. Cl. 260—327  12 Claims ABSTRACT OF THE DISCLOSURE
Compounds selected from the group consisting of

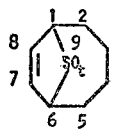 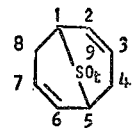 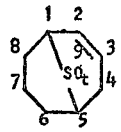

wherein $t$ is a number from 0 to 2. These compounds are pesticidal.

---

This is a continuation-in-part of application Ser. No. 482,287, filed Aug. 24, 1965, and now abandoned.

This invention is concerned with novel bicyclic sulfur containing olefins possessing pesticidal utility.

The novel compounds of the present invention are represented by the following structure:

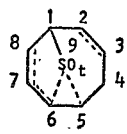

wherein $t$ is a number from 0 to 2, and where the molecule contains one double bond between carbon atoms 7 and 8 when the sulfur atom is bonded to carbon atom 6, and where the molecule contains at least one double bond between carbon atoms 2 and 3, and carbon atoms 6 and 7 respectively when the sulfur atom is bonded to carbon atom 5.

The novel compounds of the present invention can thus be represented as being selected from the group consisting of

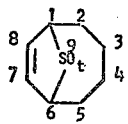 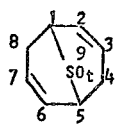 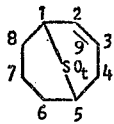

wherein $t$ is a number from 0 to 2.

Illustrative examples of the novel compounds being embraced within the present invention include the compounds as represented by the following formulas:

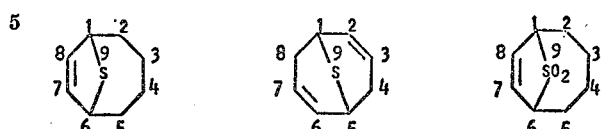

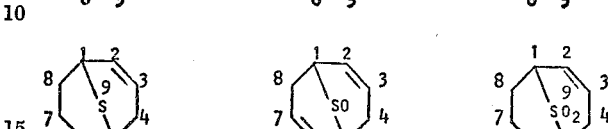

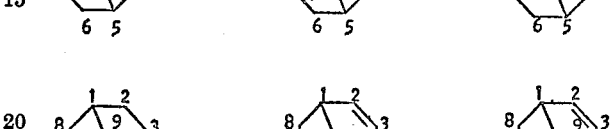

Accordingly, therefore, the invention thus encompasses compounds as described by the names 9-thiabicyclo[3.8.1]-2-nonene and the 9-oxide and 9,9-dioxide thereof; 9-thiabicyclo[4.2.1]-7-nonene and the 9-oxide and 9,9-dioxide thereof; and 9-thiabicyclo[3.3.1]-2,6-nonadiene and the 9-oxide and 9,9-dioxide thereof.

The novel compounds of this invention are prepared via the intermediates described, inter alia, in French Pat. 1,141,397. Thus, as is taught, e.g., by said patent, 9-thiabicyclo[3.3.1]-2-nonene may be prepared by the following sequence:

(1) 1,5-cyclooctadiene is reacted with sulfur dichloride, thereby producing 2,6-dichloro-9-thiabicyclo[3.3.1]nonane; this reaction is preferably run at a temperature of from about —40 to about 150 degrees centigrade, and it may be run in the presence of an inert mutual solvent (see, e.g., pp. 1–3 of said patent).

(2) The nonane so produced is thermally dehydrochlorinated at a temperature of from about 110 to about 220 degrees centigrade until approximately one mole of hydrogen chloride is evolved, thereby producing 6-chloro-9-thiabicyclo[3.3.1]-2-nonene. Though no solvent is required for this dehydrochlorination, an inert aromatic or aliphatic hydrocarbon solvent may be used. Though no catalyst is required, a Lewis acid catalyst may advantageously be used to accelerate the reaction (see, e.g., p. 8 of said patent).

(3) The nonene thus prepared may be dechlorinated with the use of, e.g., lithium aluminum hydride or other suitable dechlorinating agents, thereby producting the desired 9-thiabicyclo[3.3.1]-2-nonene.

Thus, e.g., 9-thiabicyclo[4.2.1]-7-nonene is most conveniently prepared by the removal of two chlorine atoms from 7,8-dichloro-9-thiabicyclo[4.2.1]nonane via the use of zinc, magnesium, or other reactive metals. 7,8-dichloro-9-thiabicyclo[4.2.1]nonane, as is described in Example 4 of this specification and said French patent, e.g., may be prepared by reacting 1,3-cyclooctadiene with sulfur dichloride.

Thus, e.g., the sulfur-diene of the invention, namely 9-thiabicyclo[3.3.1]-2,6-nonadiene, is prepared by elimination of HX from a compound of the formula

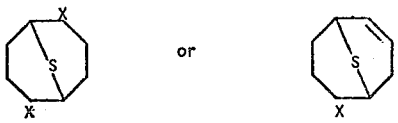

wherein X is acyloxy, hydroxy, alkoxy, aryloxy, alkylthio, acylthio, or substituted amino, these compounds being described, e.g., in Examples 11, 13, 14, 21, 22, 23, 28, and 31 of said patent. The elimination reaction is generally carried out by heating, depending upon the nature of the substituent, to about 110–300 degrees centigrade in the liquid phase or to about 200–600 degrees centigrade in the vapor phase until substantially the desired number of molar equivalents of HX are released. The reaction, when conducted in the liquid phase, may require from a few seconds to several days, depending upon the temperature and the nature of the substituent; but in the vapor phase the reaction time should not exceed a few minutes lest the product be decomposed.

Representative starting materials for the reaction include 2,6-diacetoxy-9-thiabicyclo [3.3.1] nonane, 6-acetoxy-9-thiabicyclo [3.3.1]-2-nonene and their higher acyloxy homologs where the acyloxy group may represent the radical of an aliphatic or aromatic carboxylic, dicarboxylic, or polycarboxylic acid; 2,6-dichloro-9-thiabicyclo [3.3.1] nonane; 6-chloro-9-thiabicyclo [3.3.1]-2-nonene; 2,6-bis (trimethylammonium) - 9 - thiabicyclo [3.3.1]-nonane dihydroxide; 6-(trimethylammonium)-9-thiabicyclo [3.3.1]-2-nonene hydroxide; O,O-diethyl S-9-thiabicyclo [3.3.1]-2-nonene-6-yl phosphorodithioate; and the like.

The 9-oxides of this invention may be prepared by oxidizing the nonenes or sulfur-dienes of this invention with about one equivalent of a sulfur oxidizing agent, and the 9-dioxides of this invention may be prepared by oxidizing said compounds with about two equivalents of said oxidizing agent. Thus, e.g., one may prepare 9-thiabicyclo [3.3.1]-2-nonene 9,9-dioxide by oxidizing 9-thiabicyclo [3.3.1]-2-nonenes with two molar equivalents of peracetic acid. Other sulfur-oxidizing agents may be used, such as perbenzoic acid, perphthalic acid, other peroxy acids, nitric acid, nitrogen dioxide, permanganates, chromic acid or dichromates, bromic acids or bromates, hypochlorous acid or chlorine plus water, or other like oxidants.

Molecular oxygen may also be employed, preferably using a catalyst such as vanadium oxide, nitrogen oxide, or the like.

The novel compounds of the present invention have utility as chemical intermediates, and as pesticides. As biotoxicants they have been noted to be active against both fungal parasites and insects (nematodes included), as will be illustrated in the working examples that are made a part of the present application. Generally, when the novel compounds of the present invention are employed as pesticides they will be applied at rates ranging from between about 0.1 pound per acre up to several hundred pounds per acre, the amount depending upon pest species, crop sensitivity, weather conditions and other factors known to those skilled in the art.

While the novel compounds of the present invention may be utilized as pesticides in the pure form, they can be conveniently employed in the form of formulations which in many instances enhance pesticidal activity. Suitable formulations include solutions of the pesticide composition in solvents, such as petroleum hydrocarbons, for example, xylene, heavy aromatic naphthas, and the like. An aqueous dispersion or emulsions generally contain surface active agents such as those listed in "Soap and Chemical Specialties," vol. 31, No. 7, pages 50–61; No. 8, pages 48–61; No. 9, pages 52–67 and No. 10, pages 38–67 (1955). The novel compound of the present invention may also be formulated as solid formulations, for example, on solid granular or powdered carriers such as talc, silica, vermiculite, clay, ground corn cobs, solid fertilizer, and the like. Additionally, the solid formulations can contain surface active agents, sticking agents, stabilizing agents or binders to facilitate their application.

The novel compound of the present invention may further be formulated with other pesticides as, for example, other fungicides such as sulfur, the fungicidal dithiocarbamates, nitropolychlorobenzenes and various fungicidal compositions containing chlorinated alkylthio groups such as captain. Furthermore, the compounds of the present invention may be formulated with insecticides such as the chlorinated hydrocarbon insecticides, the phosphate insecticides and the carbamate insecticides, and with herbicides such as sodium chlorate, sodium borate, 2,4–D, the herbicidal triazines, herbicidal ureas, and the herbicidal uracils.

Additionally, the novel compounds of the present invention may be formulated and admixed with a synergist that serves to enhance the pesticidal activity, for example, piperonyl butoxide, and the like. Of course, it is to be appreciated any pesticidal composition may be used in combination with the composition of the present invention which may serve to enhance, complement or synergize said compound.

The monoolefins of the invention are capable of copolymerization, for example, with other monoolefins, such as proplene and the like. The diolefins of the invention are even more readily polymerizable, both by themselves and with other monomers.

As chemical intermediates the monoolefins and diolefins may add electrophilic reagents such as halogen, thiols, and the like. For example, 9-thiabicyclo [3.3.1]-2,6-nonadiene readily adds O,O-diethyl phosphorodithiolate to yield O,O-diethyl S-(9-thiabicyclo [3.3.1]-2-nonen-6-yl)phosphorodithioate, a useful insecticide and miticide.

In the examples, specification, and claims that follow, the term "parts" indicates part by weight or volume and all temperatures are given in degrees centigrade, unless otherwise stated.

The following examples are given for purposes of illustration and are not intended to be limiting, as obvious modifications will occur to those of ordinary skill in the art.

EXAMPLE 1

9-thiabicyclo [3.3.1]-2-nonene 1,296 parts of 1,5-cyclooctadiene and 1,236 parts of sulfur dichloride were added from separate vessels simultaneously to 1,500 parts of hexane with stirring and cooling to about 10 to 20 degrees centigrade. After addition was complete, the mixture was stirred for one hour. The solids were then removed by filtration and, after drying, were found to comprise 1,295 parts of 2,6-dichloro-9-thiabicyclo [3.3.1] noane with a melting point of 100 to 101 degrees centigrade. Recrystallization of the crude product from benzene-heptane mixture gave a colorless crystalline solid with a melting point of 102 to 103 degrees centigrade. Theoretical chlorine and sulfur content is 33.7 and 15.1 percent, respectively; analysis revealed an actual chlorine and sulfur content of 33.6 percent and 15.3 percent, resepectively.

211 parts of the 2,6-dichloro-9-thiabicyclo [3.3.1] nonane so produced were heated at a temperature in the range of 166 to 184 degrees centigrade for 20 hours until 36.5 parts (by volume) of hydrogen chloride (measured by collection in water and titration thereof) were evolved. The residue was distilled under vacuum to give 148 parts of a colorless distillate comprised of 6-chloro-9-thiabicyclo [3.3.1]-2-nonene with a boiling point of 64 to 69 degrees centigrade (at 0.3 millimeter). Theoretical chlorine content for chloro-9-thiabicyclo [3.3.1]-2-nonene is 20.3 percent; analysis revealed an actual chlorine content of 19.9 percent.

To a solution of 19 parts of lithium aluminum hydride in dry ether was added 175 parts of the 6-chloro-9-thiabicyclo[3.3.1]-2-nonene. The mixture was refluxed and stirred for one hour at 60 degrees centigrade, ethyl acetate was slowly added thereto to destroy excess hydride, and the mixture was then filtered. After distilling off the solvent, the residue was recrystallized from aqueous methanol to obtain 125 grams of colorless crystalline solid, melting point 143–143.5 degree centigrade. The nuclear magnetic resonance spectrum showed an ethylenic C-H peak at 5.91 p.p.m. ($\delta$ relative to tetramethylsilane) having an integrated intensity equal to two protons out of a total of 12.

Analysis.—Calculated for $C_8H_{12}S$ (percent): S, 22.8. Found (percent): S, 22.43.

EXAMPLE 2

9-thiabicyclo[3.3.1]-2-nonene 9-oxide

To 140 grams of 9-thiabicyclo[3.3.1]-2-nonene in 1000 milliliters of glacial acetic acid were slowly added at 20–30 degrees centigrade 34 grams of hydrogen peroxide (as 114 grams of 30 percent hydrogen peroxide). The mixture is then stirred overnight at room temperature (about 24 degrees centigrade), then briefly warmed on the steam bath. The mixture is then stripped to a pot temperature of 100 degrees centigrade under aspirator vacuum at a pressure of about 20 millimeters of mercury and the residue triturated with water to remove traces of acetic acid remaining. The waxy residue is then dried under vacuum to obtain the desired product having the correct percentage of sulfur for 9-thiabicyclo[3.3.1]-2-nonene 9-oxide. The product appears to be a mixture of diastereoisomers as is to be expected because of the nonplanar nature of the —SO— grouping.

EXAMPLE 3

9-thiabicyclo[3.3.1]-2-nonene 9,9-dioxide

To 7.5 parts of 9-thiabicyclo[3.3.1]-2-nonene in 50 parts of acetic acid were added 12 parts of 30 percent hydrogen peroxide gradually at 30–60 degrees centigrade, then the mixture was heated for one hour at 100 degrees centigrade. The solvent was then stripped off and the residue recrystallized from benzene-hexane mixture to obtain 7 parts of colorless crystals, melting point 253–255 degrees centigrade. The infrared spectrum showed intense bands indicative of the —$SO_2$— grouping and the C=C linkage.

Analysis.—Calculated for $C_8H_{12}O_2S$ (percent): C, 55.78; H, 7.02; S, 18.61. Found (percent): C, 55.22; H, 6.74; S, 18.50.

EXAMPLE 4

9-thiabicyclo[4.2.1]-7-nonene

To 8000 milliliters of benzene were added with stirring at 25 degrees centigrade over 7 hours 216 grams of 1,3-cyclooctadiene and 206 grams of sulfur dichloride. The solvent was then distilled off the residual syrup sublimed in a short path sublimator at 7 microns to obtain 7,8-dichloro-9-thiabicyclo[4.2.1]nonane as a waxy solid. This was recrystallized from ethanol to obtain the pure compound as a colorless crystalline solid, melting point 180–182 degrees centigrade.

Five parts of 7,8-dichloro-9-thiabicyclo[4.2.1]nonane and 20 parts of zinc dust were stirred and heated at 100 degrees centigrade in 50 parts of methoxypropanol for 50 hours, then the mixture filtered, diluted with water and hexane, the hexane layers separated, washed with water, dried over magnesium sulfate, filtered, and stripped free of hexane. The residual liquid was heated at 130 degrees centigrade (0.5 millimeter of mercury) in a short path still to obtain a colorless waxy sublimate, showing a C=C absorption in the infrared spectrum and having the correct sulfur analysis for 9-thiabicyclo[4.2.1]-7-nonene.

Analysis.—Calculated for $C_8H_{12}S$ (percent): S, 22.8. Found (percent): S, 22.2.

EXAMPLE 5

9-thiabicyclo[4.2.1]-7-nonene 9,9-dioxide

A solution of 18 parts of 7,8-dichloro-9-thiabicyclo[4.2.1]nonane in 100 parts by volume of acetic acid was heated for 3 hours at 100 degrees centigrade as 33 parts of 30 percent hydrogen peroxide was added portionwise. The mixture was then allowed to cool slowly and the solids which crystallized out were removed by filtration. The dried solids (17 parts) melted at 264 degrees centigrade with decomposition and had the correct elemental analysis for 7,8-dichloro-9-thiabicyclo[4.2.1]nonane 9,9-dioxide.

A mixture of 15 parts of this sulfone, 12.5 parts of zinc dust, and 120 parts of ethanol was stirred and refluxed for 4 days. The mixture was then filtered and the alcohol stripped off leaving a residue which was recrystallized from methanol and water, using clay and magnesium oxide to remove trace of inorganic impurities, to obtain the desired 9-thiabicyclo[4.2.1]-7-nonene 9,9-dioxide as a colorless solid, melting point 190–191 degrees centigrade.

Analysis.—Calculated for $C_8H_{12}O_2S$ (percent): C, 55.78; H, 7.02; S, 18.61. Found (percent): C, 55.68; H, 7.00; S, 18.81.

The nuclear magnetic resonance spectrum showed two vinylic protons as a quartet at $\delta$ 6.3 p.p.m.

When intstead of 33.0 parts, about 16.5 parts of 30 percent hydrogen peroxide are used, all the other conditions remaining essentially the same, 9-thiabicyclo[4.2.1]-7-nonene 9-oxide is obtained.

EXAMPLE 6

Soil infested with *Fusarium oxysporum P. lycopersici* was mixed with 9-thiabicyclo[3.3.1]-2-nonene at the rate of 64 pounds per acre (to 6 inch depth), then small tomato seedlings were planted therein three days later. The seedling remaining healthy and free of Fusarium symptoms whereas comparable seedlings planted in similarly infested, but utreated soil were severely damaged by Fusarium wilt disease. Similar results are obtained using the corresponding sulfoxide and sulfone.

EXAMPLE 7

Houseflies (*Musca domestica*) were sprayed with a 0.1 percent aqueous dispersion of 9-thiabicyclo[3.3.1]-2-nonene 9,9-dioxide and observed for toxic effects. At two hours after spraying, 70 percent of the flies were prostrate and at 24 hours after spraying, 100 percent of the flies were dead.

EXAMPLE 8

9-thiabicyclo[3.3.1]-2,6-heptadiene

A solution of 36.5 grams of adipic acid, 55 grams of triethylamine and 89 grams of 6-chloro-9-thiabicyclo[3.3.1]-2-nonene in 500 milliliters of acetone was refluxed for 12 hours, then filtered to removed triethylamine hydrochloride, evaporated on the steam bath, and the residual material taken up in ether. This solution was washed with aqueous sodium bicarbonate, dried over sodium carbonate, filtered, an equal volume of heptane added, and the solution then partially evaporated until crystals appeared. These crystals were filtered out to obtain 28 grams of colorless solids, melting point 109–111 degrees centigrade, having the correct elemental analysis and infrared spectrum for the bis(9-thiabicyclo[3.3.1]-2-nonen-6-yl) ester of adipic acid.

Ten grams of this ester was heated to 265 degrees centigrade in a still, causing evident decomposition in the still pot and evolution of vapors at a still head temperature of 205–230 degrees centigrade. These vapors were condensed in an ice-cooled trap and then redistilled, collecting the fraction boiling at 220-225 degrees centrigrade. The infrared spectrum of this product showed no carbonyl group indicating that the ester group had been eliminated; the spectrum showed strong olefinic CH at 3011 cm.$^{-1}$, an unusually long wave length C=C stretching band at 1590 cm.$^{-1}$ (6.3μ), a strong cis—CH=CH band at 709 cm.$^{-1}$, and a C—S band at 658 cm.$^{-1}$.

*Analysis.*—Calculated for $CH_{10}S$ (percent): S, 23.2. Found (percent): S, 22.5.

This product was stable to storage at −10 degrees centigrade, but when kept at room temperature it deposited a solid high-melting polymer.

What is claimed is:

1. The compound as represented by the following structure:

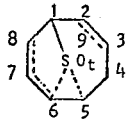

wherein $t$ is a number from 0 to 2, and where the molecule contains one double bond between carbon atoms 7 and 8 when the sulfur atom is bonded to carbon atom 6, and where the molecule contains at least one double bond between carbon atoms 2 and 3, and carbon atoms 6 and 7, respectively, when the sulfur atom is bonded to carbon atom 5.

2. The compound of claim 1, wherein the sulfur atom is bonded to carbon atoms 1 and 5 and there is one double bond betwen carbon atoms 2 and 3.

3. The compound of claim 2 wherein $t$ is 0.

4. The compound of claim 2 wherein $t$ is 2.

5. The compound as represented by the following structure:

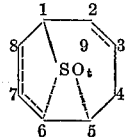

wherein $t$ is a number from 0 to 2, and where the molecule contains one double bond between carbon atoms 7 and 8 when the sulfur atom is bonded to carbon atom 6, and where the molecule contains a double bond between carbon atoms 2 and 3 and carbon atoms 6 and 7 when the sulfur atom is bonded to carbon atom 5.

6. The compound of claim 5, wherein the sulfur atom is bonded to carbon atoms 1 and 6.

7. The compound of claim 5 wherein the sulfur atom is bonded to carbon atoms 1 and 5 and there are two double bonds, one betwen carbon atoms 2 and 3, the other between carbon atoms 6 and 7.

8. The compound of claim 6 wherein $t$ is 0.

9. The compound of claim 6 wherein $t$ is 1.

10. The compound of claim 6 wherein t is 2.

11. A compound of the formula

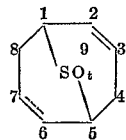

wherein $t$ is from 1 to 2.

12. The compound of claim 11 wherein $t$ is 1.

References Cited

Weil et al.: J. Org. Chem. 31(6): 1669—79 (June 13, 1966).

HENRY R. JILES, Primary Examiner

C. M. SHURKO, Assistant Examiner

U.S. Cl. X.R.

260—79.7, 329, 332.1, 332.5; 424—275

PO-1050
(5/69)

UNITED STATES PATENT OFFICE
CERTIFICATE OF CORRECTION

Patent No. 3,574,233          Dated April 6, 1971

Inventor(s)    - Edward D. Weil

It is certified that error appears in the above-identified patent and that said Letters Patent are hereby corrected as shown below:

Column 2, line 26, change " $[3.8.1]$ " to read --- $[3.3.1]$ ---;

Column 2, line 33, change "1,141,397" to read --- 1,412,397 ---;

Column 2, line 54, change "producting" to read --- producing ---;

Column 4, line 14, change "captain" to read --- captan ---;

Column 4, line 59, change "noane" to read --- nonane ---;

Column 4, line 66, change "resepectively" to read --- respectively ---;

Column 6, line 32, change "intstead" to read --- instead ---.

Signed and sealed this 26th day of October 1971.

(SEAL)
Attest:

EDWARD M. FLETCHER, JR.          ROBERT GOTTSCHALK
Attesting Officer                 Acting Commissioner of Paten